E. J. HARDGRAVE.
CALCULATING MACHINE.
APPLICATION FILED AUG. 14, 1916.
1,218,255.
Patented Mar. 6, 1917.
6 SHEETS—SHEET 1.
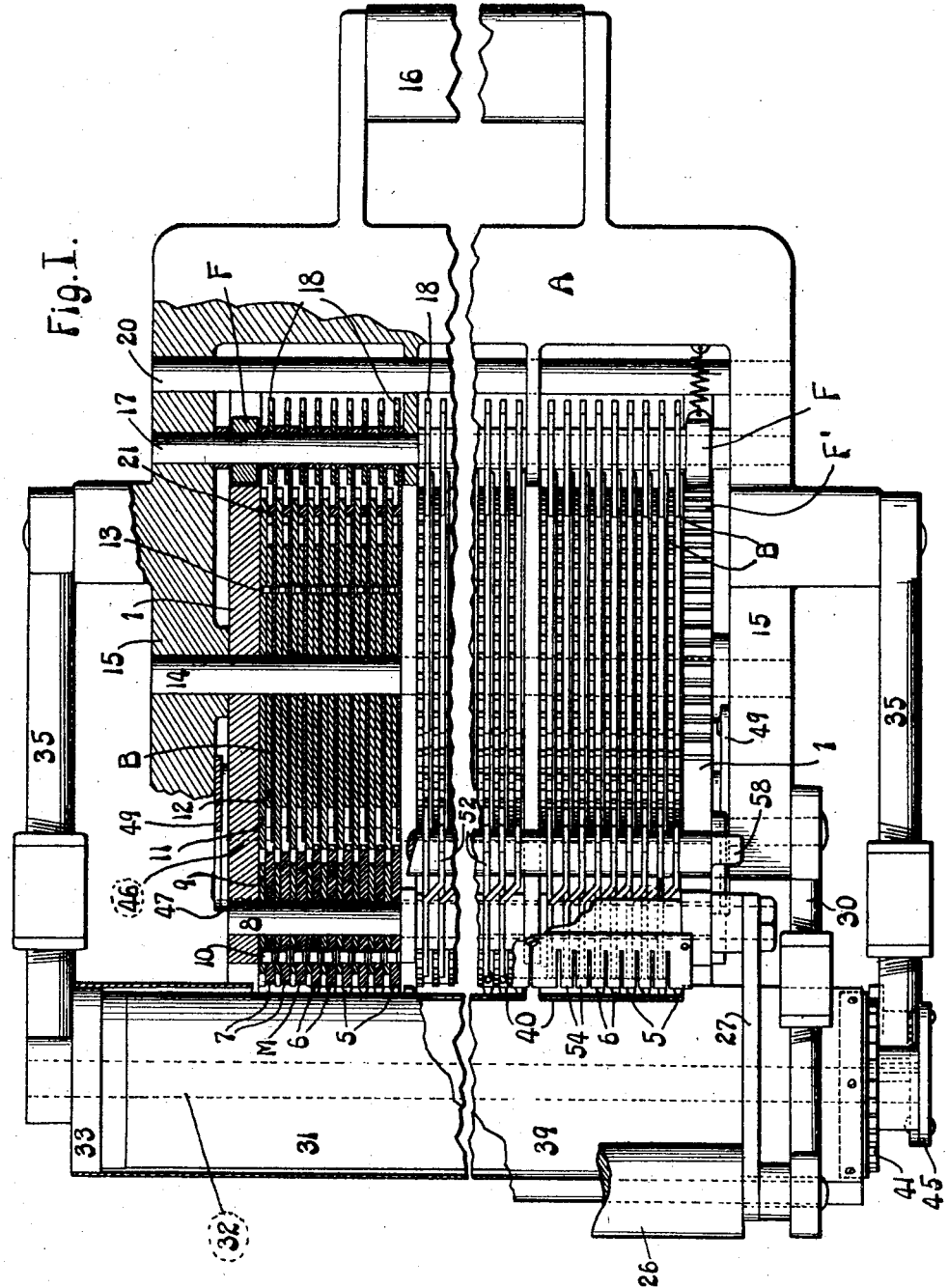
Fig. I.
Inventor:
E. J. Hardgrave
by Knight Brook
Attys.

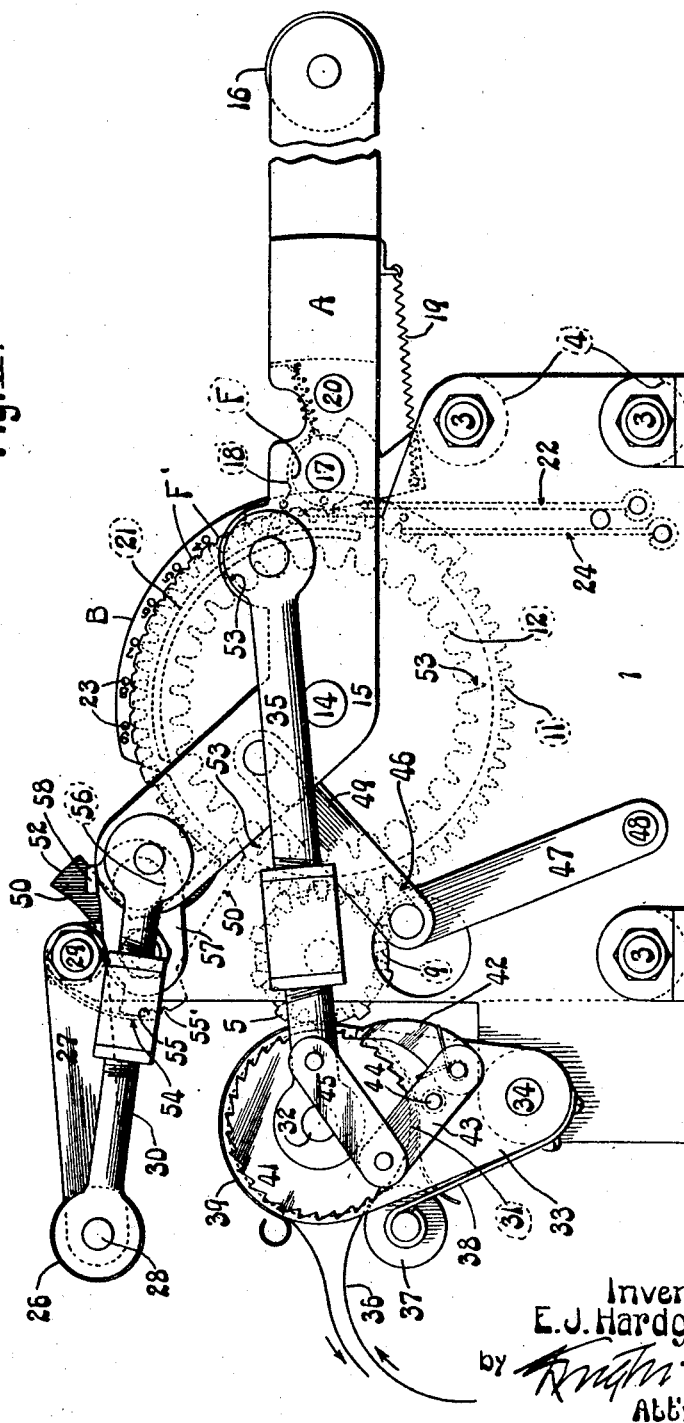

E. J. HARDGRAVE.
CALCULATING MACHINE.
APPLICATION FILED AUG. 14, 1916.
1,218,255.
Patented Mar. 6, 1917.
6 SHEETS—SHEET 3.
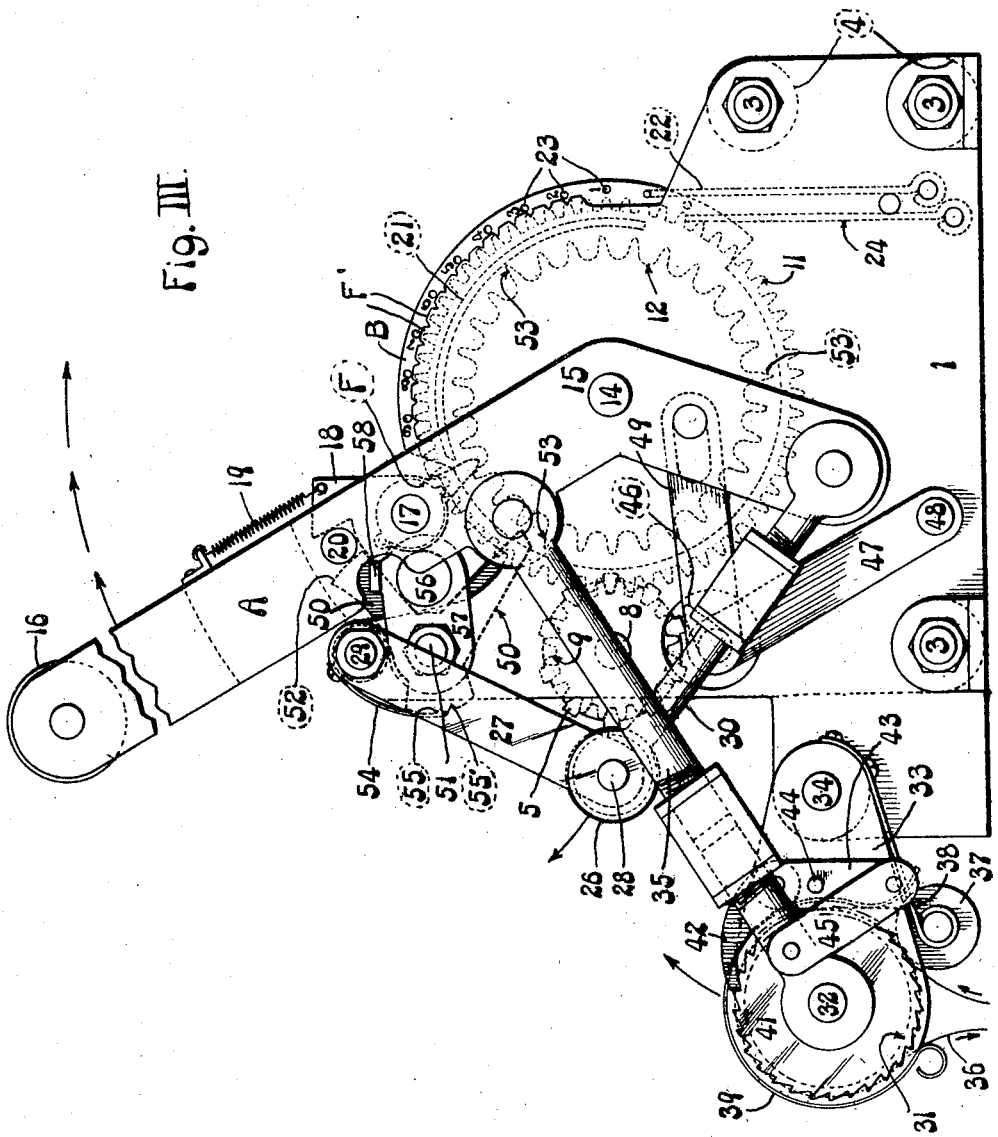
Inventor:
E. J. Hardgrave
by Knight & Cook
Attys.

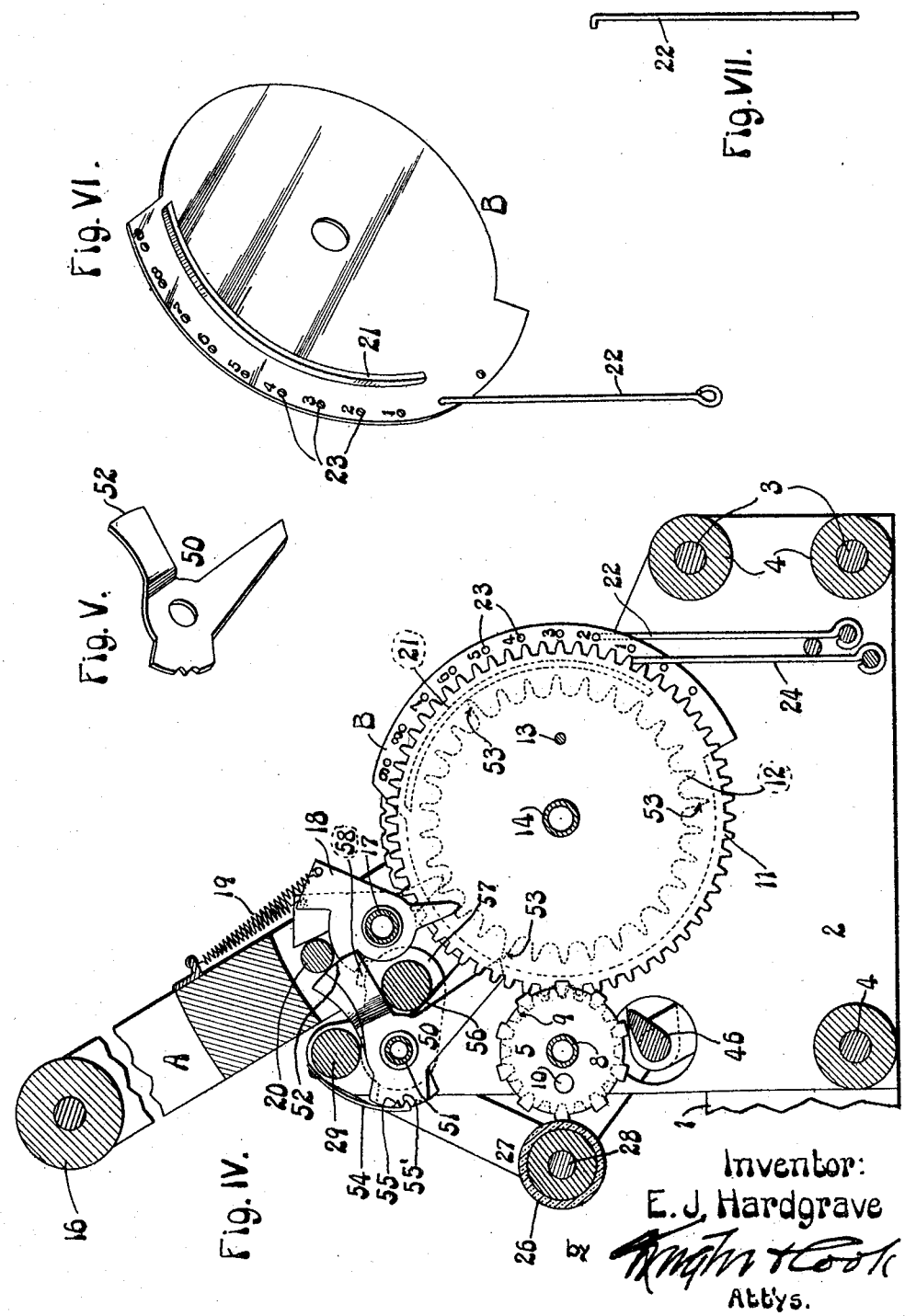

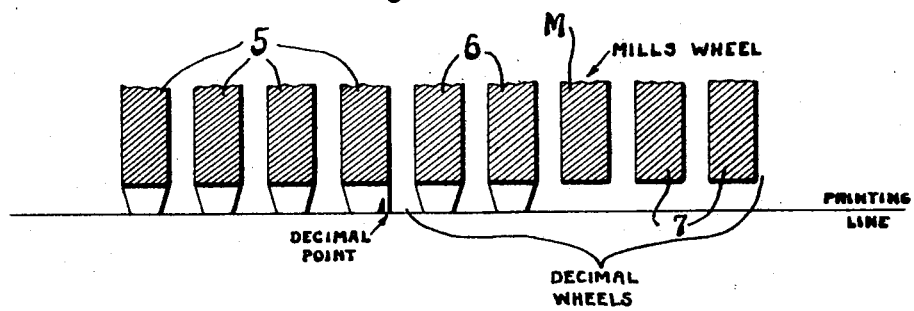
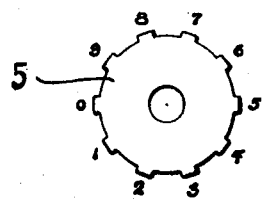
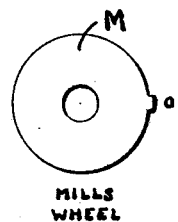
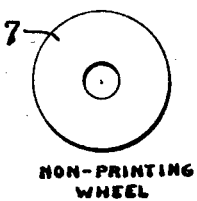
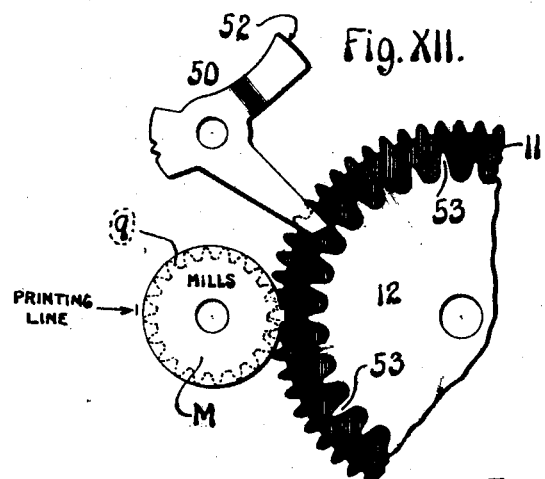

E. J. HARDGRAVE.
CALCULATING MACHINE.
APPLICATION FILED AUG. 14, 1916.

1,218,255.

Patented Mar. 6, 1917.
6 SHEETS—SHEET 6.

Fig. XIII.

| VALUATION | $1.10 PER $100. | 50¢ PER $100. | 23¢ PER $100 | TOTAL AMOUNT OF TAX AT $1.83 PER $100 |
|---|---|---|---|---|
| $10. | .11 | .05 | .02 | .18 |
| 20. | .22 | .10 | .05 | .37 |
| 30. | .33 | .15 | .07 | .55 |
| 40. | .44 | .20 | .09 | .73 |
| 50. | .55 | .25 | .120 | .920 |

Fig. XIV.

| | 23¢ PER $100. | | |
|---|---|---|---|
| VALUATION | TRUE AMOUNT | AMOUNT RECORDED | AMOUNT PRINTED |
| $10. | .023 | .02800 | .02 |
| 20. | .046 | .05100 | .05 |
| 30. | .069 | .07400 | .07 |
| 40. | .092 | .09700 | .09 |
| 50. | .115 | .12000 | .120 |

Inventor:
E. J. Hardgrave
by Knight + Cook
Attys.

UNITED STATES PATENT OFFICE.

EVERETT J. HARDGRAVE, OF SAN ANGELO, TEXAS.

CALCULATING-MACHINE.

1,218,255. Specification of Letters Patent. Patented Mar. 6, 1917.

Application filed August 14, 1916. Serial No. 114,750.

*To all whom it may concern:*

Be it known that I, EVERETT J. HARDGRAVE, a citizen of the United States of America, a resident of San Angelo, in the county of Tom Green, State of Texas, have invented certain new and useful Improvements in Calculating-Machines, of which the following is a full, clear, and exact description, reference being had to the accompanying drawings, forming a part of this specification.

My invention relates to improvements in calculating machines, one of the objects being to produce an accumulator whereby substantially correct calculations may be registered or recorded without using a series of superfluous or immaterial numbers. More specifically stated, the preferred form of the invention is adapted for use in making calculations involving decimals some of which are so small as to be immaterial. For example, in making interest tables, or rate sheets showing the amount of taxes to be paid on various different assessments, and at various different rates, many of the calculations if made accurately will involve very small fractions of a cent. However, the assessor is only interested in determining whether the smaller decimals are exactly one-half of a cent, or more or less than one-half of a cent, the exact decimal being immaterial. The elements of my accumulator are preferably so constructed and arranged that a series of decimals may be recorded and added, but when the amount is less than five mills, the number at the mills point will not be printed; when the amount is over five mills it will be printed as an additional cent, and if the amount in question is exactly five mills it will be printed as an additional cent followed by a distinguishing character which indicates that the calculation is exactly one-half of a cent too high. For example—

.024 is recorded and printed .02
.025 is recorded and printed .030
.026 is recorded and printed .03

In the first example the amount is less than two and one-half cents and is therefore printed as two cents. In the second example the amount is exactly two and one-half cents and by printing this as three cents, followed by the distinguishing character "0," the reader will know that the amount is exactly one-half of a cent too high. In the third instance the amount more than two and one-half cents is printed as three cents. It will be observed that the printed calculations are in strict accordance with the "give and take" method of calculating fractions of a cent, and the reader is advised when the calculation is exactly one-half of a cent, so that the desired adjustment may be made.

To accomplish these results, the total registering or recording devices include what I term a total equalizer for registering or recording decimals, said total equalizer being a decimal recorder preferably located three points to the right of the decimal point. In the structure I have shown, this total equalizer is a mills wheel corresponding to the other total wheels of the accumulator, said mills wheel and its transferring mechanism being arranged five steps in advance of the true recording position. Instead of printing all of the characters 0 to 9, the mills wheel is preferably provided with a single distinguishing character located at the "0" point for the purpose of indicating amounts that are exactly one-half of a cent too high. By constructing and arranging the parts in this manner, the mills calculation is always one-half of a cent too high, and all of the foregoing results are accomplished as will be hereinafter fully described.

With the foregoing and other objects in view the invention comprises the novel construction, combination and arrangement of parts hereinafter more specifically described and illustrated in the accompanying drawings wherein is shown the preferred embodiment of the invention; however, it is to be understood that the invention comprehends changes, variations and modifications which come within the scope of the claims hereunto appended.

Figure I is a plan view, partly in section, of a calculating machine embodying the features of my invention.

Fig. II is a side elevation of the machine shown in Fig. I.

Fig. III is a view similar to Fig. II, the parts being shown in different positions.

Fig. IV is a vertical section showing one of the transferring pawls in the position it occupies at the end of a transferring operation.

Fig. V is a perspective view of one of the transferring dogs.

Fig. VI is a perspective view of one of the adjustable timing devices or pawl retainers whereby one of the drive pawls is retained in an inoperative position until the operating handle reaches a predetermined point.

Fig. VII is a detail view of one of the latch devices for holding a pawl retainer in the position to which it is adjusted.

Fig. VIII is a fragmentary diagrammatical view of one of the banks of total wheels.

Fig. IX is a detail view of one of the total wheels.

Fig. X is a detail view of the equalizing wheel which constitutes the mills wheel of the accumulator.

Fig. XI is a detail view of one of the non-printing total wheels.

Fig. XII is a fragmentary view illustrating the advanced mills wheel in its normal, or starting, position.

Fig. XIII is a fragmentary view of a tax table.

Fig. XIV is a diagrammatical view showing the manner in which the totals are recorded and printed by the new accumulator.

To illustrate the invention I have shown a calculating machine provided with side plates 1, which constitute the main supporting elements of the machine, and intermediate plates 2 arranged between the side plates, said plates being secured together by horizontal bolts 3 and separating sleeves 4 which surround said bolts. The machine is thus divided into several compartments, each of which is adapted to receive a bank of total wheels and actuating device therefor. The only object in using several banks of total wheels is to record or print several different totals at the same time, thus facilitating the operation of printing a large table involving several columns of figures.

In the structure I have shown, each set of total recording devices includes four total wheels 5 for recording and printing units, one of said wheels being provided with means for printing the decimal points (Fig. VIII), and two total wheels 6 adapted to record and print the first two decimals at the right of the decimal point. Each of the wheels just described is provided with type characters 0 to 9, inclusive, on its periphery, as shown most clearly in Fig. IX. A complete bank of total wheels is shown in section at the upper left hand portion of Fig. I, but the diagrammatical view, Fig. VIII, more clearly illustrates the arrangement of the printing and non-printing wheels. Each bank of total wheels also includes a mills wheel M located three points to the right of the decimal point, and two non-printing wheels 7 for accumulating smaller decimals at the right of the mills point. The mills wheel is provided with a single distinguishing type character located at the "0" point on the periphery of said wheel. This character may be "0" as indicated in Fig. X, or any other suitable distinguishing character adapted to serve as an indicating mark as will be hereinafter described.

All of the total wheels 5, 6, M and 7 are loosely mounted on a shaft 8 and free to rotate independently of each other. 9 designates pinions, each of which is secured to one of the total wheels by means of a rivet 10, as shown in Figs. I and IV.

Each bank of total wheels is associated with a bank of transmission wheels, or auxiliary total wheels serving as means for transmitting movements to the total indicating and printing wheels on the shaft 8. Each bank of transmission wheels includes a series of large gear wheels 11 and a series of master wheels 12.

Each large gear wheel 11 meshes with one of the pinions 9 and is secured to a master wheel 12 by means of a rivet 13 (Figs. I and IV). All of the wheels 11 and 12 are loosely mounted on a shaft 14. Each pinion 9 has twenty teeth, the large gear wheel 11 meshing therewith being provided with sixty teeth, and each master wheel 12 being provided with thirty teeth. Therefore, any one of the master wheels 12 may be selected and advanced one step (one tooth) with the result of advancing a pinion 9 one-tenth of a revolution. The means for actuating the accumulator comprises an oscillatory frame A provided with a pair of legs 15 which lie at opposite sides of the machine, said frame being pivotally supported by the shaft 14 so that it may be shifted from the position shown in Figs. I and II to the position shown in Fig. III. 16 designates an operating handle at the upper end of the frame A.

A pivot rod 17, extending across the frame A, is secured at its ends to the legs 15. This pivot rod constitutes a pivotal support for the drive pawls 18. 19 designates springs tending to force the points of the drive pawls toward the master wheels 12. A stop rod 20 carried by the oscillatory frame A serves as a stop for all of the drive pawls 18, and the springs 19 tend to force the pawls into engagement with said rod. Each drive pawl 18 is alined with one of the master wheels 12, and its lower portion is adapted to engage said master wheel as shown in Figs. III and IV.

Each bank of transmission wheels is also provided with a series of timing devices, or pawl retaining devices B (Figs. I, IV and VI) whereby the drive pawls are temporarily held away from the master wheels 12. Each pawl retaining device B is a substantial circular member, made of thin sheet metal and located adjacent to one of the master wheels 12. Each pawl retaining device B has an arcuate pawl track 21 in the form of a rib which extends over and lies adjacent to the teeth of a master wheel 12. All of the pawl retainers B are loosely supported by the shaft 14 and they may be turned about the axis of said shaft for the purpose of adjusting the arcuate pawl tracks 21 to eleven different positions. 22 designates yieldable latch devices (Figs. VI and VII) adapted to enter the numbered holes 23 in the pawl retainers B so as to secure said retainers in the positions to which they are adjusted. 24 designates springs for preventing wheels 11 and 12 from moving backwardly, the free upper ends of said springs being fitted to the large gear wheels 11.

When all of the pawl retaining devices B are located in the position shown in Fig. III, the arcuate pawl tracks 21 are so arranged that the operating handle may be oscillated without transmitting movement to the accumulator. When the operating handle is moved forwardly and downwardly from the position shown in Fig. III, all of the drive pawls 18 will engage the upper ends of the arcuate pawl tracks 21, thereby passing from the master wheels 12, and when the operating handle is restored to the position shown in Fig. III all of the pawls will return to the position therein shown without imparting movement to the master wheels. However, if one of the pawl retainers B is shifted two steps and then locked by inserting the upper end of a yieldable latch device 22 into the hole designated "2", as shown in Fig. IV, the upper end of the arcuate pawl track 21 will be so arranged that a master wheel 12 will advance two steps in response to each operative stroke of the operating handle. The pawl 18 associated with the adjusted pawl track 21 will travel idly over the adjacent master wheel when the operating handle is pulled forwardly and downwardly from the position shown in Fig. IV, but when the handle is restored to said position the pawl will pass from the upper end of the pawl track and engage a tooth of the master wheel 12 so as to advance the master wheel two steps. Obviously, all of the timing devices, or pawl retaining devices, may be adjusted to various predetermined positions so that a predetermined degree of movement will be imparted to the elements of the accumulator in response to each operative stroke of the handle. It will, therefore, be understood that a given amount may be repeatedly added in each accumulator by adjusting the pawl retainers B and thereafter oscillating the operating handle.

In Fig. XIII I have shown a fragment of a table to be used by the tax assessors for the purpose of ascertaining the amount of taxes to be paid on various property valuation. At the left side of the table, the valuations appear in steps of $10.00. The column at the right side shows the total amounts of assessments at the rate of $1.83 per hundred dollars, the intermediate columns showing the amounts into which the total is to be divided.

In setting the machine to print the figures in the valuation column, it is only necessary to select and adjust two pawl retainers B of the accumulator at the left side of the machine, so that the amount 10. will be added during each operative stroke of the handle. The amounts 10., 20., 30., etc. will then appear successively at the printing line. To indicate and print the figures in the second column, the pawl retainers of the next adjacent accumulator are so adjusted that .11 will be added during each stroke of the handle, eleven cents being the amount of taxes to be paid on $10.00 at the rate of $1.10 per hundred. The other accumulators are adjusted in a similar manner to print the amounts shown in the remaining columns. Before pointing out the peculiar manner in which some of the decimals are added, I will describe the printing device and the transferring devices.

An inking roll 26 is arranged between a pair of arms 27 and rotatably mounted on a shaft 28, said arms being pivotally supported by a rod 29. The free ends of arms 27 are connected to the legs 15 of the operating handle by means of connecting rods 30. When the operating handle moves in the direction indicated by arrows in Fig. III the inking roll 26 moves away from the type on the total wheels, as indicated by an arrow in Fig. III. The inking roll is thus shifted to the position shown in Fig. II and during the return stroke of the handle said inking roll returns to the printing wheels.

The paper carriage comprises a platen roller 31 fixed to a shaft 32, the latter being rotatably mounted in a pair of arms 33. A rod 34 extending from the side plates of the machine (Figs. II and III) forms a pivotal support for the arms 33. In moving toward and away from the printing line, the arms 33 and platen roller 31 oscillate about the axis of the rod 34. Connecting rods 35 arranged at opposite sides of the machine connect the paper carriage to the legs 15 of the operating handle. It will be apparent that this pivoted carriage will oscillate toward and away from the printing line in response to the movements of the operating handle. The strip of paper 36 (Figs. II and III) is forced into engagement with the platen roller 31 by means of a small roller 37 journaled in the free ends of springs 38. 39 designates a shield secured to the arms 33 and extending almost entirely around the platen roller 31. This shield is provided with openings 40 (Fig. I) which allow the printing type to engage the paper on the platen roller.

The paper feeding device comprises a ratchet wheel 41 (Figs. I, II and III) fixed to the shaft 32 and the pawl 42 for actuating said ratchet wheel. A lever 43, pivoted at 44 to one of the arms 33, is pivotally connected to the pawl 42. 45 designates a link connecting the lever 43 to one of the connecting rods 35. When the operating handle moves from the position shown in Fig. III to the position shown in Fig. II the feed pawl 42 moves idly along the teeth of ratchet wheel 41, and when the operating handle is restored, the feed pawl is actuated to turn the ratchet wheel and platen roller, thus feeding the paper 36 in the direction indicated by arrows.

46 designates an alining bar (Figs. I, II and III) extending across the machine and adapted to engage the large gear wheels 11 as shown in Fig. II for the purpose of alining the type members before the printing operation. Supporting arms 47, pivotally supported at 48, are secured at their upper ends to the alining bar 46. 49 designates links, pivoted to the free upper ends of the supporting arms 47 and loosely connected to the operating handle as shown most clearly in Figs. II and III. The links 49 serve as means for transmitting movement from the operating handle to the alining bar 46.

The transferring device includes transferring dogs 50 (Figs. IV and V) pivotally supported by a shaft 51 and adapted to coöperate with the drive pawls 18. Each transferring dog 50 has an abutment face 52 adapted to engage an abutment shoulder on one of the drive pawls 18, as shown in Fig. IV, and also adapted to occupy the position shown in Fig. III wherein it will not engage the pawl 18. Each master wheel 12 has three transferring teeth 53 which are longer than the other teeth on said wheel, said transferring teeth being adapted to engage and trip one of the transferring dogs 50. It will be observed each transferring wheel has thirty teeth and that its transferring teeth 53 are arranged ten steps apart. When the "0" type of a total wheel is located at the printing line, the master wheel 12 associated with said total wheel will occupy the position shown in Figs. II and III. When a master wheel is in this position one of its long transferring teeth 53 will be approximately one step in advance of the adjacent carrying dog 50. When the master wheel advances nine steps, the character 9 will appear at the printing line and one of the long transferring teeth 53 will lie immediately in front of the lower extremity of a carrying dog 50. During the next succeeding step of the master wheel the character "0" will be shifted to the printing line and the long transferring teeth 53 will shift the adjacent carrying dog 50 from the position shown in Fig. III to the operative position shown in Fig. IV. The abutment face 52 of the operative transferring dog will then lie in the path of the abutment shoulder on a drive pawl 18. Upon the completion of the operative stroke of the handle the drive pawl 18 just referred to will strike the abutment face 52 as shown in Fig. IV so as to advance the next adjacent master wheel of higher order. Each transferring dog 50 is offset as shown most clearly in Fig. V, so that its lower extremity will be in alinement with the transferring teeth of one master wheel while its abutment face 52 is alined with the drive pawl for actuating the adjacent master wheel of the next higher order. The carrying dogs 50 are normally retained in their inoperative positions (Figs. II and III) by means of yieldable detents 54 which then lie in notches 55 on the arcuate faces of the carrying dogs. Each carrying dog 50 is also provided with a notch 55' adapted to receive one of the detents 54 when the carrying dog occupies its operative position (Fig. IV).

The means for restoring the carrying dogs to their inoperative positions comprises a restoring rod 56 extending across the machine at a point immediately below the upper extensions of the carrying dogs, and secured at its ends to a pair of arms 57, the latter being pivotally supported by the shaft 51. Each arm 57 is provided with a lug 58 which lies in the path of one of the legs 15 on the oscillatory frame A. The arms 57 and restoring rod 56 may be shifted upwardly from the positions shown in Fig. IV for the purpose of restoring the transferring dogs 50, and a movement of this kind takes place immediately before the frame A and its operating handle reaches the position shown in Fig. II. All of the tripped carrying dogs are thus restored to their inoperative positions by a movement of the main operating handle after the transferring operations have been completed.

F designates "full stroke" pawls (Figs. I, II and III) pivoted to the oscillating frame A, and adapted to coöperate with segmental rows of teeth F' on the side plates 1, to insure "full strokes" of the operating handle in a manner well understood in this art.

By referring to the table (Fig. XIII) it will be noted that only two decimals are printed at the right of the decimal point, and that in some instances the distinguishing character "0" is printed at the right of a decimal. Each accumulator includes five decimal wheels only two of which are provided with the type characters "0" to "9", inclusive. The third decimal wheel, or equalizing wheel located at the "mills" point, has only one type character and the fourth and fifth decimal wheels are not provided with type. However, all of the decimal wheels are provided with calculating mechanism so that amounts involving five decimals may be calculated in each accumulator. As previously suggested, in following the "give and take" method of calculating amounts involving less than one cent, it is only necessary to ascertain whether the smaller amount is exactly one-half of a cent, or whether it is more or less than one-half of a cent. I, therefore, eliminate the useless decimals from the printed record and at the same time produce a means for calculating amounts involving decimals smaller than one-half of a cent.

To accomplish this the means for recording or registering the mills is arranged five steps in advance of the true recording position, and the mills wheel M has only one type character. This type character appears at the "0" point on the mills wheel. The calculating elements associated with all of the total wheels, excepting the mills wheel, occupy the normal or starting position shown in Fig. III, wherein one of the long transferring teeth 53 is located approximately one step in advance of the adjacent transferring dog 50. Fig. XII shows starting position of the mills wheel and its transferring devices. The mills wheel is arranged five steps in advance of the printing point and the transferring tooth 53 associated with the mills wheel is approximately six steps in advance of the adjacent transferring dog 50. Therefore, the mills wheel and its transferring devices will occupy positions five steps in advance of the true recording position. To illustrate the result obtained from this combination and arrangement of elements I direct attention to the diagram shown in Fig. XIV. This diagram shows the amount of taxes to be paid at the rate of 23 cents per hundred dollars on valuations ranging from ten to fifty dollars. The exact amount to be paid on $10.00 would be .023, and this being less than two and one-half cents the amount charged would be two cents. The amount recorded in the accumulator is .02800, the mills calculation being five points too high, but the amount printed is .02, the exact amount to be charged. The second horizontal line of calculations illustrated in Fig. XIV shows that .046 is the exact calculation and that the amount recorded in the machine is .05100, an amount five mills too high, but the amount printed is .05, the exact amount to be collected. Whenever the true amount includes a decimal less than one-half of a cent the smaller decimal will be entirely eliminated from the amount printed. When the true amount is more than one-half of a cent it will be printed as an additional cent, and when the third decimal is exactly one-half of a cent it will be printed as an additional cent, followed by the distinguishing character "0" so that any desired adjustment may be made. For example, the last horizontal row of figures in Fig. XIV shows that the exact amount is .115, the amount recorded being .12000. The calculation is, of course, five mills too high but the amount printed is .120, thus indicating that the true amount is exactly one-half of a cent less than twelve cents.

In some instances, where the amount includes more than three decimals, the distinguishing character will appear at the mills point when the amount printed is approximately but not exactly one-half of a cent too high. For example, if the true amount is .1154, the characters .120 will appear at the printing line.

I claim:

1. An accumulator having total recording devices including an equalizing device arranged in advance of its true registering position, transferring devices associated with said total recording devices, the transferring device associated with said equalizing device being arranged in advance of the true registering position, and operating means for actuating all of said devices, said equalizing device and its transferring device being adapted to remain in their advanced positions during the calculating operations so as to repeatedly register amounts higher than the true calculations.

2. An accumulator having total registering devices for recording or registering units and decimals, said total registering devices including an equalizing device located three points to the right of the decimal point and arranged five steps in advance of its true registering position, transferring devices associated with said total registering devices, the transferring device associated with said equalizing device being arranged five steps in advance of the true registering position, and operating means for actuating all of said devices, said equalizing device and its transferring device being adapted to remain in their advanced positions during the calculating operations, so as to repeatedly register decimals five-thousandths higher than the true calculations.

3. An accumulator comprising total recording devices including an equalizing device whereby minor amounts are calculated and transferred to a higher order, said equalizing device including a transferring element advanced five points higher than the normal transfer point, and said transferring element being retained in said advanced or abnormal position during the calculating operations so as to repeatedly perform its transferring operation at a point five steps in advance of the normal transfer point.

4. An accummulator having total wheels including an equalizing wheel having a transferring element arranged five steps in advance of the normal transfer position, each of said total wheels, excepting the equalizing wheel, being provided with type characters 0 to 9 inclusive for printing amounts registered by the accumulator, said equalizing wheel being arranged to the right of the other total wheels and provided with type for printing a distinguishing symbol when the "0" point on the advanced equalizing wheel occupies its printing position.

5. An accumulator comprising total registering and printing devices including an equalizing device having a transferring element arranged five points higher than the normal transferring point, said equalizing device being provided with means for printing a distinguishing symbol when its "0" point occupies the registering position, thus indicating that the character of next higher order is too high.

EVERETT J. HARDGRAVE.

Copies of this patent may be obtained for five cents each, by addressing the "Commissioner of Patents, Washington, D. C."